US010350536B2

(12) United States Patent
Peterson

(10) Patent No.: US 10,350,536 B2
(45) Date of Patent: Jul. 16, 2019

(54) REVERSE FLOW DEHUMIDIFIER AND METHODS OF OPERATING THE SAME

(71) Applicant: CLIMATE BY DESIGN INTERNATIONAL, INC., Owatonna, MN (US)

(72) Inventor: Thomas R. Peterson, Owatonna, MN (US)

(73) Assignee: CLIMATE BY DESIGN INTERNATIONAL, INC., Owatonna, MN (US)

( * ) Notice: Subject to any disclaimer, the term of this patent is extended or adjusted under 35 U.S.C. 154(b) by 130 days.

(21) Appl. No.: 15/804,032

(22) Filed: Nov. 6, 2017

(65) Prior Publication Data

US 2018/0126323 A1 May 10, 2018

Related U.S. Application Data

(60) Provisional application No. 62/419,523, filed on Nov. 9, 2016.

(51) Int. Cl.
*B01D 53/04* (2006.01)
*B01D 53/26* (2006.01)
(Continued)

(52) U.S. Cl.
CPC ..... *B01D 53/0454* (2013.01); *B01D 53/0438* (2013.01); *B01D 53/0446* (2013.01); *B01D 53/0462* (2013.01); *B01D 53/261* (2013.01); *B01D 53/30* (2013.01); *F24F 3/1411* (2013.01); *B01D 2253/104* (2013.01); *B01D 2253/106* (2013.01); *B01D 2253/108* (2013.01); *B01D 2253/1124* (2013.01); *B01D 2253/1128* (2013.01); *B01D 2259/4508* (2013.01)

(58) Field of Classification Search
CPC ............ B01D 53/0438; B01D 53/0446; B01D 53/0454; B01D 53/0462; B01D 53/261; B01D 53/30; B01D 2253/104; B01D 2253/106; B01D 2253/108; B01D 2253/1124; B01D 2253/1128; B01D 2259/4508; F24F 3/14; F24F 3/1411
USPC ...... 96/109–114, 143, 144, 146; 34/80, 472, 34/473; 62/271
See application file for complete search history.

(56) References Cited

U.S. PATENT DOCUMENTS 3,119,673 A 1/1964 Asker et al.
3,193,985 A 7/1965 Siggelin
(Continued)

*Primary Examiner* — Frank M Lawrence, Jr.
(74) *Attorney, Agent, or Firm* — Stinson LLP

(57) ABSTRACT

A reverse flow dehumidifier system for dehumidifying a conditioned space is provided. The system includes a housing having: a static desiccant block fixedly coupled to the housing and comprising a desiccant media; a fan configured to direct outside air across the desiccant media during a first operating phase and a second operating phase and configured to direct conditioned air across the desiccant media during a third operating phase. The system further includes a control system operatively coupled to at least one of the fan, and which includes a plurality of sensors selectively positioned inside the housing and inside the conditioned space, the plurality of sensors are configured to measure at least one air parameter of the outside air during the first operating phase and configured to measure the at least one air parameter of the conditioned air during the third operating phase.

22 Claims, 6 Drawing Sheets

(51) Int. Cl.
*F24F 3/14* (2006.01)
*B01D 53/30* (2006.01)

(56) References Cited

U.S. PATENT DOCUMENTS

| | | | |
|---|---|---|---|
| 4,180,985 A | 1/1980 | Northrup, Jr. | |
| 4,691,530 A | 9/1987 | Meckler | |
| 4,786,301 A | 11/1988 | Rhodes | |
| 4,887,438 A | 12/1989 | Meckler | |
| 4,982,575 A | 1/1991 | Besik | |
| 5,251,458 A | 10/1993 | Tchernev | |
| 5,325,676 A | 7/1994 | Meckler | |
| 5,649,428 A | 7/1997 | Calton et al. | |
| 5,709,736 A * | 1/1998 | Fujimura | B01D 53/06 55/400 |
| 5,873,256 A | 2/1999 | Denniston | |
| 5,938,523 A * | 8/1999 | Khelifa | B60H 3/0633 454/156 |
| 5,953,926 A | 9/1999 | Dressler et al. | |
| 6,035,551 A * | 3/2000 | Scheufler | B01D 46/00 34/475 |
| 6,205,795 B1 | 3/2001 | Backman et al. | |
| 6,321,551 B1 | 11/2001 | Backman et al. | |
| RE37,464 E | 12/2001 | Meckler | |
| 6,467,279 B1 | 10/2002 | Backman et al. | |
| 6,539,731 B2 | 4/2003 | Kesten et al. | |
| 6,557,365 B2 | 5/2003 | Dinnage et al. | |
| 6,575,228 B1 * | 6/2003 | Ragland | F24F 3/1411 165/54 |
| 6,622,508 B2 | 9/2003 | Dinnage et al. | |
| 6,652,628 B1 | 11/2003 | Hess | |
| 6,694,757 B1 | 2/2004 | Backman | |
| 6,711,907 B2 | 3/2004 | Dinnage et al. | |
| 6,772,534 B2 | 8/2004 | Gomes et al. | |
| 6,935,131 B1 | 8/2005 | Backman | |
| 7,047,751 B2 | 5/2006 | Dinnage et al. | |
| 7,101,414 B2 | 9/2006 | Dinnage et al. | |
| 7,260,945 B2 | 8/2007 | Landry | |
| 8,453,474 B2 | 6/2013 | Eisenhour | |
| 8,790,451 B1 | 7/2014 | Narayanamurthy | |
| 2004/0237540 A1 * | 12/2004 | Okano | F02C 6/18 60/784 |
| 2013/0174730 A1 * | 7/2013 | Kayser | F24F 3/1423 95/10 |
| 2014/0230479 A1 | 8/2014 | Ito et al. | |
| 2014/0250930 A1 | 9/2014 | Unezaki et al. | |
| 2016/0061475 A1 | 3/2016 | Ito et al. | |

* cited by examiner

REVERSE FLOW DEHUMIDIFIER AND METHODS OF OPERATING THE SAME

CROSS-REFERENCE TO RELATED APPLICATIONS

This application is based on and claims priority to U.S. Provisional Application Ser. No. 62/419,523, filed on Nov. 9, 2016, which is incorporated herein by reference in its entirety.

STATEMENT REGARDING FEDERALLY SPONSORED RESEARCH OR DEVELOPMENT

Not applicable.

STATEMENT REGARDING JOINT RESEARCH AGREEMENT

Not applicable.

BACKGROUND OF THE INVENTION

The field of the disclosure relates generally to a dehumidifier system, and more particularly, to a control system for a reverse flow dehumidifier and methods of dehumidifying an environment.

Desiccant assisted air conditioning systems typically incorporate a rotating desiccant wheel that rotates between two air streams to provide dehumidification or humidification by alternating the energy in a gas phase change process. In such systems, the air delivered to the interior of a space to be conditioned space crosses the desiccant material, which attracts and holds moisture. As the desiccant wheel rotates, the moist desiccant material enters the regeneration air stream where it is heated to release moisture, which is then vented away. Because humidity is a function of vapor pressure, desiccant materials have the ability to remove or add moisture adiabatically; a reversible thermodynamic process in which the energy exchanges result in substantially constant enthalpy equilibrium.

The total desiccant open cycle is somewhat similar to a refrigerant vapor-compression cycle. In a desiccant and air system the heated regeneration air adds energy to the moistened desiccant in a de-sorption process and releases moisture in the regenerating crossing air stream in an adiabatic cooling process. When the desiccant rotates to the process air stream, the pre-conditioned desiccant enables the sorption of water and dehumidifies the crossing process air. Adiabatic re-heat then is released in the air stream and completes the desiccant vapor-compression open cycle. A typical rotating wheel desiccant system releases heat from the regeneration process into the conditioned space when the desiccant wheel rotates from the regeneration stream to the moisture adsorption stream. This inefficiently heats the conditioned space when the overall goal is to cool the conditioned space.

Further, a typical rotating wheel desiccant system is typically designed so that it will operate effectively on a "full load" design day when ambient outside air temperature and humidity levels are relatively high for the geographic area where the system is installed. For example, a typical system may be designed to operate effectively on a "design day" when ambient outside air conditions are at a 0.4% condition for the geographic area (i.e., the load on the system due to ambient outside air conditions would only be higher than the "design day" 0.4% of the time). On any given day when the system is operating, however, the ambient outside air temperature and humidity levels are typically lower than those on the "design day." Thus, a typical rotating wheel desiccant system is over designed, which causes it to operate in an inefficient manner.

For example, a typical rotating wheel desiccant system has a fixed rotational speed at which the desiccant wheel continuously rotates (e.g., the wheel may rotate 360 degrees in, for example, 3.75 minutes). The rotational speed is set so that the system operates effectively on the "design day" when ambient outside air conditions are relatively extreme. Thus, the speed is set so that on the "design day" the desiccant rotates into the regeneration stream when it has adsorbed moisture to the point that it is no longer effectively reducing the moisture level within the conditioned space. On a typical day when outside ambient air conditions are less extreme than on the "design day," the desiccant rotates into the regeneration stream when it still has capacity to adsorb moisture from the air within the conditioned space. The regeneration process consumes a relatively high amount of the energy necessary to operate the system, and also inefficiently adds waste heat into the conditioned space when the overall goal is to cool the conditioned space. Thus, it is generally desired to minimize the amount of time during which the desiccant undergoes the regeneration process. With a typical rotating wheel desiccant system, however, the regeneration process continuously operates on a portion of the desiccant and the desiccant enters the regeneration process sooner than necessary.

Typical desiccant systems with a rotary desiccant wheel may also experience increased design, manufacturing, setup, operating, and/or maintenance costs. Additionally, known desiccant systems may have reduced energy efficiencies while occupying a large footprint for the components. Moreover, conventional desiccant systems may include refrigeration components to dehumidify. Refrigeration components, however, can add complexity, cost, environmental concerns, and energy consumption and operating inefficiencies.

BRIEF SUMMARY OF THE INVENTION

A reverse flow dehumidifier system in accordance with one embodiment of the invention described herein includes a housing, a static desiccant block coupled to the housing and comprising a desiccant media, a heater coupled to the housing and configured to heat air within the housing, a fan for directing air flow within the housing, and a control system operatively coupled to at least one of the fan and the heater. The housing has an outside air inlet, a react discharge air outlet, a conditioned air inlet, and a conditioned air outlet. The fan is configured during a first operating phase and a second operating phase to direct air entering the housing through the outside air inlet across the desiccant media and out of the housing through the react discharge air outlet. The fan is configured during a third operating phase to direct air entering the housing through the conditioned air inlet across the desiccant media and out of the housing through the conditioned air outlet. The control system has a plurality of sensors selectively positioned and configured to measure at least one air parameter of the air within the housing.

Preferably, during the first operating phase, the heater heats outside air before the air passes through the desiccant media to regenerate and remove moisture from the desiccant media. During the second operating phase, the heater is turned off and outside air passes through the desiccant media to cool the desiccant media. During the third operating phase, conditioned air passes through the desiccant media to remove moisture from the conditioned air. The control system preferably determines when to switch between the first, second, and third operating phases based on the measured air parameters from the plurality of sensors, the capacity of the desiccant media to retain moisture, and preferred air parameters for a conditioned space that receives conditioned air during the third operating phase. The reverse flow dehumidifier system is preferably more efficient than conventional systems because it continuously monitors measured air parameters and determines when to switch between the first, second, and third operating phases. This allows the reverse flow dehumidifier system to minimize the time spent during the first operating phase when energy usage from the heater is relatively high and maximize the time spent during the third operating phase to the extent that the desiccant media is able to effectively remove moisture from the conditioned air passing through it. Further, cooling the desiccant media during the second operating phase allows the reverse flow dehumidifier system to be more efficient than conventional systems that do not cool the desiccant media before the desiccant media is used to remove moisture from conditioned air and thus release appreciable amounts of heat into the conditioned space.

A reverse flow dehumidifier system in accordance with another embodiment of the invention described herein includes a housing with an outside air inlet, a react discharge air outlet, a conditioned air inlet, and a conditioned air outlet. A static desiccant block is coupled to the housing and includes a desiccant media. A heater is coupled to the housing and configured to heat air within the housing. A first damper is coupled to the housing. The first damper is movable between a closed position, in which it blocks air from entering the housing through the outside air inlet, and an open position, in which air may enter the housing through the outside air inlet. A second damper is coupled to the housing. The second damper is movable between a closed position, in which it blocks air from exiting the housing through the conditioned air outlet, and an open position, in which air may exit the housing through the conditioned air outlet. A third damper is coupled to the housing. The third damper is movable between a first position, in which air may exit the housing through the react discharge air outlet, and a second position, in which it blocks air from exiting the housing through the react discharge air outlet. During a first operating phase and a second operating phase, the first damper is in the open position, the second damper is in the closed position, and the third damper is in the first position. During a third operating phase, the first damper is in the closed position, the second damper is in the open position, and the third damper is in the second position. A fan is coupled to the housing and configured during the first operating phase and the second operating phase to direct air entering the housing through the outside air inlet across the desiccant media and out of the housing through the react discharge air outlet. The fan is configured during the third operating phase to direct air entering the housing through the conditioned air inlet across the desiccant media and out of the housing through the conditioned air outlet.

A dehumidification system in accordance with another embodiment of the invention described herein utilizes two of the reverse flow dehumidifier systems described above as modified to operate in combination with each other. Each of the reverse flow dehumidifier systems includes at least one damper operable to move between a closed position for blocking air flow through an inlet/outlet of the housing and an open position for allowing air flow through an inlet/outlet of the housing. The dehumidification system includes at least one damper motor that is operable to move a damper of each of the reverse flow dehumidifier systems such that one of the dampers is in its open position when the other of the dampers is in its closed position. The dehumidification system includes a single control system that controls operation of both reverse flow dehumidifiers in a manner such that one of the reverse flow dehumidifiers is in its first operating phase or its second operating phase while the other of the reverse flow dehumidifiers is in its third operating phase. In this manner, the dehumidification system can continuously remove moisture from conditioned air within a conditioned space due to the fact that at least one of the reverse flow dehumidifier systems is operating in its third operating phase.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

The embodiments described herein relate to a reverse flow dehumidifier system. The embodiments described herein reduce design, set-up, installation, operating, maintenance, and/or replacement costs of a dehumidifier system while increasing efficiency and safety for use of the dehumidifier system. It should be understood that the descriptions and figures that utilize an ice rink as the conditioned space are exemplary only, and that the exemplary system can be used with other types of public, commercial, industrial, and residential spaces.

Figure 1:
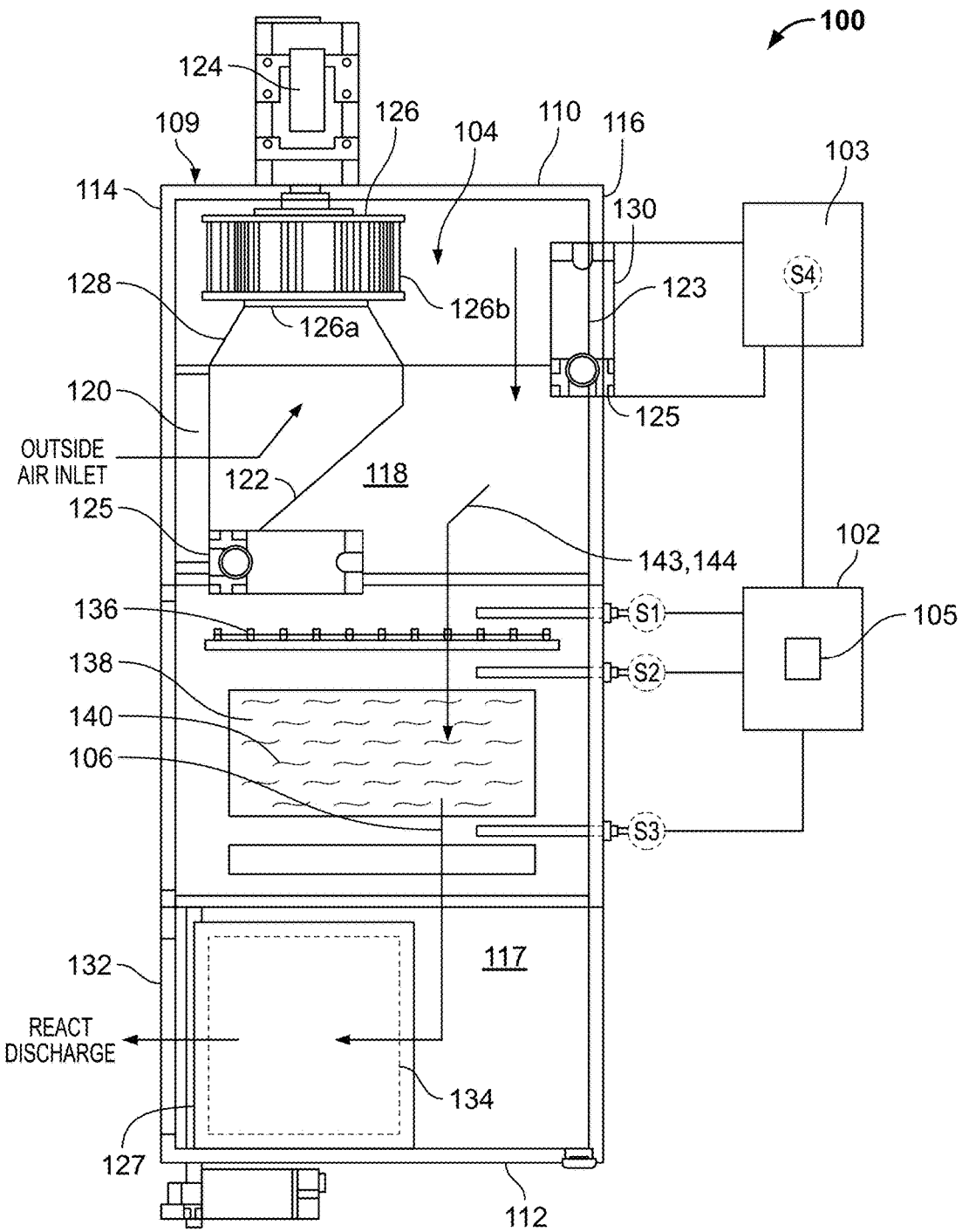
FIG. 1 is a schematic view of an exemplary reverse flow dehumidifier system having a control system showing the reverse dehumidifier system coupled to a conditioned space, wherein the reverse dehumidifier system is in a first operating phase and a second operating phase.
Figure 2:
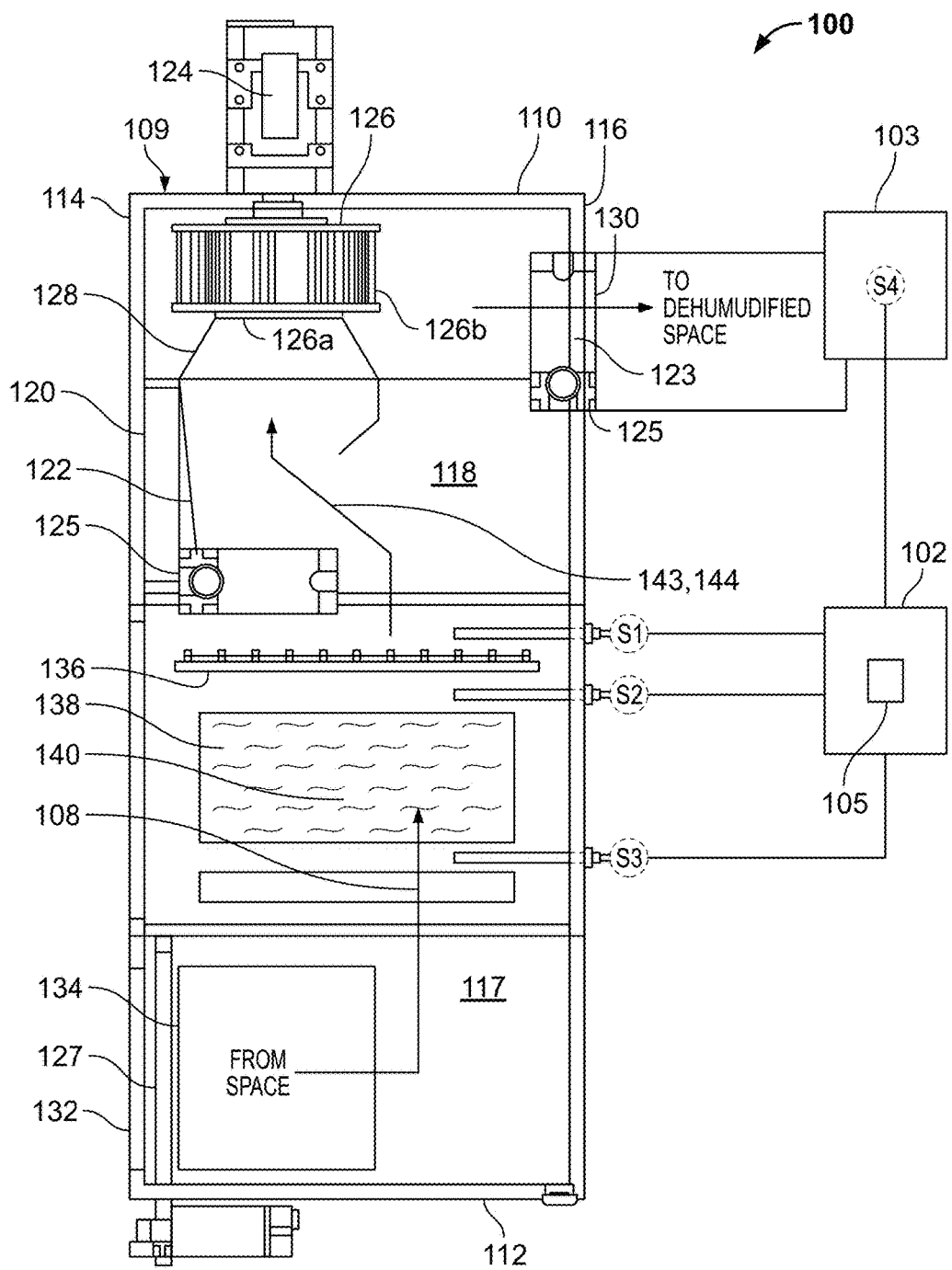
FIG. 2 is a schematic view of the reverse flow dehumidifier system of FIG. 1 shown in a third operating phase.
Figure 3:
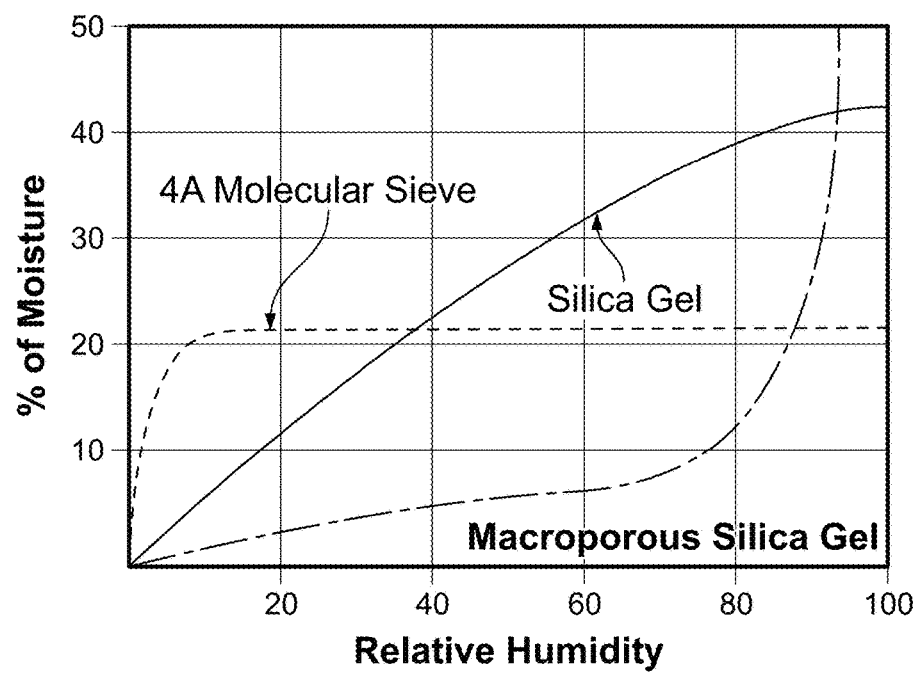
FIG. 3 is an example graph illustrating relative humidity on the X-axis compared to the percentage of moisture on the Y-axis held for different types of desiccant media.

FIG. 1 is a schematic view of a reverse flow dehumidifier system 100 having a control system 102 showing the reverse flow dehumidifier system 100 coupled in flow communication to a conditioned space 103. The reverse flow dehumidifier system 100 is shown in a first operating phase 104 and a second operating phase 106. FIG. 2 is a schematic view of the reverse flow dehumidifier system 100 shown in a third operating phase 108. FIG. 3 is an example graph illustrating relative humidity on the X-axis compared to the percentage of moisture on the Y-axis held for different types of desiccant media for the reverse flow dehumidifier system 100. The reverse flow dehumidifier system 100 is configured for large conditioned spaces 103 with moisture loads that are controlled with a selective or optimal range for selective and/or intermittent dehumidification of return air from the conditioned space 103. In the exemplary embodiment, the reverse flow dehumidifier system 100 does not require refrigeration for dehumidification of the air. As described herein, in the exemplary embodiments, the reverse flow dehumidifier system 100 uses unconditioned outside air, in the same direction as desorption, in combination with temperature and/or dew point comparison controls to stop flow when selective or maximum cooling has been achieved prior to the point of adsorption from the cooling stream (i.e., the system stops the process of cooling the desiccant material with unconditioned outside air and begins the process of conditioning outside air for delivery to the conditioned space 103 when a sensed difference in temperature and/or dew point from sensors on both sides of the desiccant material reaches a desired level).

The embodiments described herein relate to the reverse flow dehumidifier system 100 used with a variety of conditioned spaces 103, such as ice rinks, archival storage, libraries, and pharmaceutical storage, where the relative moisture load to be dehumidified to the large volume of the space is small so that dry or dehumidified air is supplied on a selective or interrupted basis in response to a control system 102. Moreover, the control system 102 for the conditioned space 103 can operate within an allowable range of tolerances relative to preferred conditions within the conditioned space 103.

The embodiments described herein facilitate dehumidifying the air with the optimal amount of applied energy to accomplish the dehumidification of the conditioned space 103. Moreover, the embodiments utilize a single fan for airflow and a fixed or non-rotating desiccant block. Additionally, the embodiments described provide the control system 102 with associated sensors selectively positioned with the reverse flow dehumidifier system 100 to facilitate optimal sequences of the desiccant process while utilizing a stationary desiccant device.

The embodiments described herein facilitate efficient and economic dehumidification when used in cool and/or dry environments (for example only, ice rinks) where a low dew point is desired. In the exemplary embodiments, since the reverse flow dehumidifier system 100 does not produce water during the process, the described embodiments work efficiently and economically at sub-zero temperatures. Moreover, the embodiments described herein facilitate efficient and economic latent load removal with optimal humidity controls.

The reverse flow dehumidifier system 100 includes a housing 109 having an end wall 110, another end wall 112, a side wall 114, a side wall 116, a side wall 117, and another side wall opposite side wall 117 that is not shown. The end walls 110, 112 and side walls 114, 116, 117 are configured to define an enclosed space 118. The side wall 114 includes an outside air inlet 120, and a first damper 122 or louver is coupled to the housing 109 adjacent the outside air inlet 120. The first damper 122 is configured to open and close relative to the outside environment and the enclosed space 118 (i.e., the first damper 122 is movable between a closed position, in which it blocks air from entering the housing 109 through the outside air inlet 120, and an open position, in which air may enter the housing 109 through the outside air inlet 120). The outside air inlet 120 is configured to direct unconditioned outside or atmospheric air into the housing 109. The reverse flow dehumidifier system 100 further includes a motor 124 and a fan 126 coupled to the housing 109 in flow communication with the outside air inlet 120 by associated ducts 128. The other side wall 116 includes a conditioned air outlet 130, and a second damper 123 is coupled to housing 109 adjacent conditioned air outlet 130. The conditioned air outlet 130 is also coupled in flow communication to the conditioned space 103. The second damper 123 is configured to open and close relative to the conditioned space 103 and the enclosed space 118 (i.e., the second damper 123 is movable between a closed position, in which it blocks air from exiting the housing 109 through the conditioned air outlet 130, and an open position, in which air may exit the housing 109 through the conditioned air outlet 130). Moreover, the housing 109 includes a react discharge air outlet 132 in side wall 114 which is coupled in flow communication to the outside environment or atmosphere. A third damper 127 is coupled to housing 109 adjacent react discharge air outlet 132 and a conditioned air inlet 134. The third damper 127 is configured to open and close relative to the outside environment. Still further, the side wall 117 includes a conditioned air inlet 134 (shown in FIG. 2) coupled in flow communication with the conditioned space 103. The third damper 127 is configured to open and close relative to the conditioned space 103 and the enclosed space 118. By way of example, the third damper 127 may move or rotate between a first position, in which the third damper 127 blocks the conditioned air inlet 134 but does not block the react discharge air outlet 132 (shown in FIG. 1), and a second position in which the third damper 127 blocks the react discharge air outlet 132 but does not block the conditioned air inlet 134 (shown in FIG. 2). The third damper 127 may rotate approximately 90 degrees between the first and second positions. Preferably, in the first and second operating phases 104 and 106 described below the third damper 127 is in the first position to allow air flow out of the react discharge air outlet 132 and block air flow in through the conditioned air inlet 134. In the third operating phase 108 described below, the third damper 127 is preferably in the second position to allow air flow in through the conditioned air inlet 134 and block air flow out through the react discharge air outlet 132. In an alternative embodiment, the conditioned air inlet 134 can include a fourth damper (not shown) that is different than the third damper 127. For example, reverse flow dehumidifier system 100 may include, in lieu of third damper 127, the third and fourth dampers 214 and 216 shown in FIGS. 4 and 5 and described below in connection with an alternative embodiment of reverse flow dehumidifier system 200. In this configuration, third damper 214 controls air flow through react discharge air outlet 132 and fourth damper 216 controls air flow through conditioned air inlet 134. The first, second, and third dampers 122, 123, and 127 (and optional fourth damper) can be operatively coupled to the control system 102 and coupled to drive motors 125.

When first damper 122 is in the open position shown in FIG. 1 (corresponding to the first and second operating phases 104 and 106), it engages ducts 128 so that the inlet 126a of fan 126 is in fluid communication with outside air inlet 120, but not in fluid communication with react discharge air outlet 132. Thus, air can flow into the fan inlet 126a from outside air inlet 120 and out of fan outlet 126b toward react discharge air outlet 132. When first damper 122 is in the closed position shown in FIG. 2 (corresponding to the third operating phase 108), the inlet 126a of fan 126 is placed in fluid communication with conditioned air inlet 134, but is not in fluid communication with outside air inlet 120. Thus, air can flow into the fan inlet 126a from conditioned air inlet 134 and out of fan outlet 126b toward conditioned air outlet 130.

In the exemplary embodiment, the reverse flow dehumidifier system 100 includes a heater 136 selectively positioned within the enclosed space 118 between the fan 126 and the react discharge air outlet 132. The heater 136 is also selectively positioned between the fan 126 and the conditioned air inlet 134. The heater 136 includes electrical resistance heaters. Alternatively, any type of conventional heater elements may be used. For example, heater 136 may use solar heated air or water, recovered waste heat, or any other type of heat source such as rejected heat from a condenser unit. Moreover, the reverse flow dehumidifier system 100 includes a desiccant block 138 having a desiccant media 140 disposed therein and throughout.

In the exemplary embodiment, the desiccant block 138 is fixed to the housing 109 in a stationary configuration. The fixed desiccant block 138 facilitates fewer parts, less set up, operating, and/or maintenance costs as compared to rotary desiccant drums. More particularly, the housing 109 can be reduced in size and shaped to fit the particular shape (for example square or rectangular) of the fixed desiccant block 138. Moreover, the fixed desiccant block 138 is smaller than a rotary desiccant block (not shown) which reduces weight, manufacturing cost, and initial startup operation costs. Conventional rotary desiccant wheels (not shown) require seals between the rotating air streams, wherein the rotary seals configured for high temperatures and low resistance are costly. The fixed desiccant block 138 uses lower cost seals. Still further, the fixed desiccant block 138 uses less desiccant material and produces less desiccant waste material as compared to typical rotary desiccant wheels.

In the exemplary embodiment, the desiccant media 140 includes a fiber media formed into fluted air passages in which the desiccant is formed in situate. The structure and composition of the desiccant media 140 provide greater desiccant surface area without the mass to facilitate for rapid regeneration during the different phases of the dehumidification operation. In another embodiment, the desiccant media 140 includes a silica gel in the form of beads or pellets. Alternatively, other desiccant media 140 includes, but is not limited to, porous aluminum oxide, montmorillonite clay, molecular sieve (synthetic zeolite), calcium sulfate and calcium oxide.

The control system 102 is operatively coupled to the housing 109. In the exemplary embodiment, the control system 102 includes a plurality of sensors selectively positioned in the housing 109 and/or in the conditioned space 103. More particularly, the plurality of sensors includes a first sensor S1, a second sensor S2, a third sensor S3, and a fourth sensor S4 which are selectively positioned relative the housing 109 and/or the conditioned space 103. Alternatively, the sensors can be more or less than four sensors. As shown, the first sensor S1 is selectively positioned within the closed space and between the fan 126 and the heater 136. The second sensor S2 is selectively positioned within the enclosed space 118 and between the heater 136 and the desiccant block 138. The third sensor S3 is selectively positioned within the enclosed space 118 and between the desiccant block 138 and the react discharge air outlet 132 and is selectively positioned between the desiccant block 138 and the conditioned air inlet 134. Further, the fourth sensor S4 is selectively positioned within the conditioned space 103. The sensors S1, S2, S3 and S4 are configured to sense, monitor, measure, and/or report at least one air parameter 144 of the air 143 to the controller 105. The sensors S1, S2, S3 and S4 are configured to sense the at least one air parameter 144 during at least the first operating phase 104, the second operating phase 106, and the third operating phase 108. In the exemplary embodiments, sensors S1, S2 and S3 are configured to sense the at least one air parameter 144 present in the enclosed space 118. The fourth sensor S4 is configured to sense the at least one air parameter 144 present in the conditioned space 103. The at least one air parameter 144 includes at least one of relative humidity, moisture content, dew point, temperature, and speed.

During an exemplary operation, the control system 102 is configured to operatively control the flow of air 143 through the enclosed space 118, into the conditioned space 103, and out of the conditioned space 103 during the first operating phase 104, the second operating phase 106, and the third operating phase 108. During operation, however, the operating phases 104, 106, and 108 are in continuum. Accordingly, the sequence of operating phases 104, 106, and 108 may not necessarily be first, second, or third phase.

Referring to FIGS. 1 and 2, during the first operating phase 104, such as when, for example, the housing 109 has been inoperative for a period of time, the reverse flow dehumidifier system 100 is configured for desorption of the desiccant media 140. The first operating phase 104 can also be initiated when the desiccant media 140 has absorbed the target moisture. Overall, the first operating phase 104 is configured to dry the desiccant media 140. The controller 105 operatively controls the first damper 122, through drive motor 125, of the outside air inlet 120 to open so as to expose outside air to the open first damper 122 and ducts 128. Moreover, the controller 105 operatively controls the second damper 123, through drive motor 125, to close so as to cut off or isolate any flow of air 143 from the enclosed space 118 and into the conditioned space 103. Additionally, the controller 105 activates the motor 124 to turn the fan 126. The fan 126 draws the outside air through the first damper 122/ducts 128 and directs the outside air past the first sensor S1 and toward the heater 136. The first sensor S1 measures the air parameter 144 such as amount of moisture and dew point in the air 143. The first sensor S1 is configured to report the dew point value to the controller 105. The fan 126 continues to direct the air 143 through the heater 136 which is configured to heat the air 143 to lower the relative humidity of the air 143. In an example, the air 143 is heated by the heater 136 to a temperature which can be variable from about 140° Fahrenheit dry bulb ("FDB") to about 320° FDB. The controller 105 is configured to control the heater 136 to heat the air 143 depending on, for example only, the type of desiccant media 140.

If the air 143 is heated, the air 143 has a low relative humidity and a high capacity to hold water. Post heating, the second sensor S2 is configured to measure the air parameter 144 such as dew point of the air 143. The second sensor S2 is configured to report the air parameter 144 of the heated air 143 to the controller 105. The controller 105 is configured to analyze the air parameter 144 of the preheated air 143 and the heated air 143 as reported by the first sensor S1 and the second sensor S2. In response, the controller 105 can operatively control the first damper 122, the motor 124, the fan 126, and/or the heater 136 to facilitate optimal air parameters 144.

The fan 126 continues to direct the heated air 143 into the desiccant block 138 and across the desiccant media 140. The heated air 143 heats the desiccant media 140 and the water contained therein. More particularly, the water molecules become excited and break the bond with the desiccant pores of the desiccant media 140. The heated air 143 leaves the desiccant block 138 and flows across the third sensor S3. The air stream relative to the third sensor S3 and flowing past the desiccant block 138 is evaporately cooled by the addition of the water that has left the desiccant media 140. The third sensor measures the air parameter 144 such as the dew point and temperature of the air 143. The third sensor S3 reports the air parameter 144 to the controller 105. The controller 105 analyzes whether the air 143 leaving the desiccant media 140 post desorption still requires drying. If drying is required as measured and reported by the third sensor S3, the controller 105 operatively instructs the heater 136 to continue heating the air 143 prior to entry into the desiccant block 138. If further drying is not required as measured and reported by the third sensor S3, the controller 105 operatively shuts off the heater 136.

The fan 126 continues to direct the flow of air 143, which is laden with the moisture removed from the desiccant media 140, out through the react discharge air outlet 132 and into the atmosphere. During the first operating phase 104, the drying of the desiccant media 140 requires most of the energy consumed by the reverse flow dehumidifier system 100. For any given installation, there is an optimum amount of energy that can be determined by comparing the data input by the first sensor S1, second sensor S2, and then the third sensor S3. The controller 105 is configured to apply control logic to the system components to facilitate obtaining an allowable range of tolerances for air conditions in the conditioned space 103. Accordingly, in the third operating phase 108, the target level of moisture can be attained in the conditioned space 103.

In the first operating phase 104, the first sensor S1 and the second sensor S2 are located upstream of the desiccant media 140 and the third sensor S3 is located downstream of the desiccant media 140 relative to the air flow exiting the fan 126. Moreover, as shown, the fourth sensor S4 is selectively located in the conditioned space 103. In the first operating phase 104, the desiccant media 140 desorbs moisture at a higher rate in the beginning, when there is a larger vapor pressure differential, and as the air 143 goes through the desiccant media 140, wherein the vapor pressure differential is reduced. In the exemplary embodiment, this vapor pressure differential rate is specific for each type of desiccant media 140 and can be known within the limits of the changing outdoor air moisture level. The vapor pressure differential rate for each type of desiccant media 140 can also be known for the conditioned space 103 and the purposes of the activities within the conditioned space 103. The controller 105 can be uploaded with the pressure differential information or can be configured to determine (in real time, randomly, or in selective time frames), the rate of change of vapor pressure differential. The controller 105, through a differential measurement by the first sensor S1 and/or the second sensor S2 compared to the third sensor S3, determines when the target dryness of the desiccant media 140 is approaching. Moreover, in an embodiment, the target dryness of the desiccant media 140 is arrived at by knowing the difference between the absolute moisture level of the conditioned space 103 and the ability of the desorbed desiccant media 140 to provide a moisture differential to obtain the target in an allowable time or in a preselected time period.

Accordingly, during the first operating phase 104, the desiccant media 140 is desorbed to a level so that when the subsequent third operating phase 108 of adsorption takes place, the returning air from the conditioned space 103 (from the conditioned air inlet 134) is dehumidified to a level below that of a target control condition of the controller 105. Accordingly, when the air 143 is supplied to conditioned space 103, the air 143 flows to take on moisture gain (load) from the conditioned space 103. While monitoring the changing rate of desorption over time, the controller 105 is configured to determine when the desiccant media 140 is dry enough to provide the optimum condition but not using more energy than needed and not over drying the desiccant media 140. A room set point of the conditioned space 103, which is adjustable with the controller 105, determines the amount of the drying by knowing the isothermal curve of dryness to energy used during the first operating phase 104. In an example, the conditioned space 103, with higher allowable moisture levels, has lower per pound of moisture removed per energy expense.

Still referring to FIG. 1, subsequent the first operating phase 104 wherein the desiccant media 140 has been heated, in the second operating phase 106, the desiccant media 140 is cooled by the flow of air 143 through the desiccant media 140. Accordingly, during the second operating phase 106, the desiccant media 140 experiences sensible cooling. When the desiccant media 140 has been heated to desorb the moisture, the desiccant media 140 cannot take on moisture until it is cooled to some degree. Moreover, the cooler the desiccant media 140 can be, then the more effective the third operating phase 108 can be because the desiccant media 140 does not introduce unnecessary heat into the conditioned space 103 when the overall goal is to cool the conditioned space 103. This gain in efficiency does not warrant mechanical cooling or any other such energy expenditure. More particularly, the reverse flow dehumidifier system 100 does not require refrigeration in order to cool the desiccant media 140. Accordingly, only "free energy" is considered by using the unconditioned outside air, which is variable on daily conditions, on a comparative basis to the desiccant media 140 heated to a predetermined temperature. For example, on a hot day such as 100° FDB when compared to the current temperature state of the desiccant media 140 of between, for example, 140° FDB and 320° FDB, there is a temperature differential that allows for the use of using unconditioned outside air to cool the desiccant media 140. However, if the desiccant media 140 is cooled to a point that it begins to once again adsorb, the desiccant media 140 can unnecessarily remove moisture from the outdoor airstream. Therefore, during the second operating phase 106, the cooling process is monitored by the controller 105 by comparing the entering moisture level as measured by the first sensor 51 and/or the second sensor S2 to the moisture level leaving the desiccant media 140 as sensed and measured by the third sensor S3. By use of the second operating phase 106, reverse flow dehumidifier system 100 may be 3-7% more efficient than a conventional rotating wheel desiccant system that does not appreciably cool the desiccant media after it is heated during regeneration.

Referring to FIG. 2, during a reverse flow operation, the controller 105 closes the first damper 122 for the outside air inlet 120. The controller 105 also moves the third damper 127 to close the react discharge air outlet 132 and open the conditioned air inlet 134. Moreover, the controller 105 moves the second damper 123 to open the conditioned air outlet 130. With the enclosed space 118 in flow communication with the conditioned space 103 though open second damper 123, the controller 105 operatively controls the motor 124 to drive the fan 126 in the same direction compared to the fan direction of the first operating phase 104 and/or the second operating phase 106. The orientation of the closed first damper 122 and the open second and third dampers 123, 127 in the third operating phase 108 results in a reverse flow of the air 143 relative to the desiccant block 138 and desiccant media 140 as compared to the flow of air 143 during the first operating phase 104 and/or the second operating phase 106.

The fan 126 is configured to draw air 143 from the conditioned space 103, through the conditioned air inlet 134, and into the enclosed space 118. The fan 126 directs the air from the conditioned space 103, across the third sensor S3 and toward the desiccant block 138. As shown, the third sensor S3 is located upstream of the desiccant block 138 relative to the reverse air flow. The third sensor S3 measures and reports the relative humidity and temperature of the air to the controller 105 prior to the air entering the desiccant block 138. The fan 126 continues to draw the air through the desiccant media 140. The desiccant media 140 adsorbs the moisture until an allowable range of tolerances for air conditions of the conditioned space 103 is satisfied and/or the desiccant media 140 is determined to be at a maximum load of moisture. As shown, the second sensor S2 and the first sensor S1 are located downstream of the desiccant block 138 relative to the reverse flow of air 143.

The fan 126 continues to draw the air 143 across the desiccant media 140 and out of the desiccant block 138. The second sensor S2 and the first sensor S1 are configured to measure the dew point of the drawn air 143 as the air leaves the desiccant block 138. The second sensor S2 and the first sensor S1 are configured to report the air parameter 144 to the controller 105. In response, the controller 105 is configured to determine the maximum loading of moisture by the isothermal curves of the desiccant media 140 and compare to the measured conditions of moisture differential across the desiccant media 140. The controller 105 continues to receive and compare reports of the air parameter 144 from the first sensor S1, the second sensor S2 and the third sensor S3 and determines the moisture differential to be at diminishing returns so as to initiate the first operating phase 104.

During the third operating phase 108, the fan 126 continues to direct the air 143 across the second sensor S2 and the first sensor S1 and through the conditioned air outlet 130. Moreover, the fan 126 directs the air into the conditioned space 103 and across the fourth sensor S4. As shown, the fourth sensor S4 is selectively positioned within the conditioned space 103. The fourth sensor S4 is configured to measure the dew point of the air discharged into the conditioned space 103. The fourth sensor S4 reports the air parameter 144 to the controller 105. The controller 105 is configured to analyze the air parameter 144 to set the dew point within the conditioned space 103. If the controller 105 determines the air within the conditioned space 103 is dry to a predetermined level, the controller 105 shuts off the fan 126. During the first operating phase 104, the second operating phase 106, and the third operating phase 108, the control system 102 is configured to balance the air parameters 144 of the air flow on a selective or interrupted basis for optimal conditions in the conditioned space 103. The control system 102 controls the motor 124 to drive the fan 126 in one direction for the first operating phase 104 and the second operating phase 106.

The control system 102 also controls the opening of the first damper 122 and the third damper 127 and the closing of the second damper 123 to flow the air 143 in a first direction within the enclosed space 118 and across the desiccant media 140. Moreover, the control system 102 controls the closing of the first damper 122 and the third damper 127 and the opening of the second damper 123 to flow the air 143 in a second direction within the enclosed space 118 and across the desiccant media 140. The second direction is reverse of the first direction. In an alternative embodiment, the control system 102 can control the motor 124 to drive the fan 126 in a reverse direction during the third operating phase 108 as compared to the first operating phase 104 and the second operating phase 106.

Preferably, the control system 102 does not switch from the third operating phase 108 back to the first operating phase 104 and the subsequent second operating phase 106 until the control system 102 has determined based on information received from the sensors S1-S4 that the desiccant media 140 has adsorbed moisture to a point where the desiccant media 140 is no longer able to effectively remove moisture from the conditioned space 103. By operating in this manner, the control system 102 maximizes the time spent in the third operating phase 108 and minimizes the time spent in the first and second operating phases 104 and 106. It is generally desirable to minimize the time spent in the first and second operating phases 104 and 106 because the first operating phase 104, and operation of heater 136 in particular, consumes a relatively high amount of the total energy required to operate reverse flow dehumidifier system 100. Further, it is generally desirable to reduce heating of the desiccant media 140 beyond a level that is necessary because some of the heat added to the desiccant media 140 may be released into the conditioned space 103 during the third operating phase 108, particularly on days when the outside air temperature is relatively high and thus unable to cool the desiccant media 140 during the second operating phase 106 to a level near the temperature of the conditioned space 103. Thus, by having a fixed desiccant block 138 with a housing 109 and first, second, and third dampers 122, 123, and 127 set up to enable a reverse flow configuration (i.e., flow through the desiccant block 138 in one direction during adsorption of moisture from the conditioned space 103, and flow through the desiccant block 138 in an opposite direction for regeneration and cooling of the desiccant block 138) and a control system 102 that is able to switch between the first, second, and third operating phases 104, 106, and 108 based on information received from sensors S1-S4, reverse flow dehumidifier system 100 is operable in a more efficient manner than conventional rotating desiccant wheel systems that continuously heat desiccant media on a schedule that does not maximize use of the desiccant during the adsorption phase and minimize heating of the desiccant during the regeneration phase. For these reasons, reverse flow dehumidifier system 100 may be 10-20% more efficient than a conventional rotating wheel desiccant system.

In the exemplary embodiments, the microprocessor-based controller 105 is operably connected to the motor 124, fan 126, dampers 122, 123, 127 and sensors S1-S4 in the housing 109 for automatically cycling operation thereof. The controller 105 may include an automatic shut-off mechanism for terminating operation of any or all of these components in the event of malfunctioning or excessive heat generation. The control system 102 relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The embodiments can take the form of an entirely hardware embodiment, an entirely software embodiment or an embodiment containing both hardware and software elements. In an exemplary embodiment, the system is implemented in software, which includes but is not limited to firmware, resident software, microcode, etc.

Furthermore, the embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system of the embodiments suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or "I/O" devices (including but not limited to keyboards, displays, pointing devices, etc.) can be coupled to the system either directly or through intervening I/O controller 105s. Network adapters may also be coupled to the system to enable the data processing system to become coupled to other data processing systems or remote printers or storage devices through intervening private or public networks. Modems, cable modem and Ethernet cards are just a few of the currently available types of network adapters.

The software, algorithm and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the embodiments are described with reference to a particular programming language. It will be appreciated that a variety of programming languages may be used to implement the teachings of the embodiments as described herein.

Figure 4:
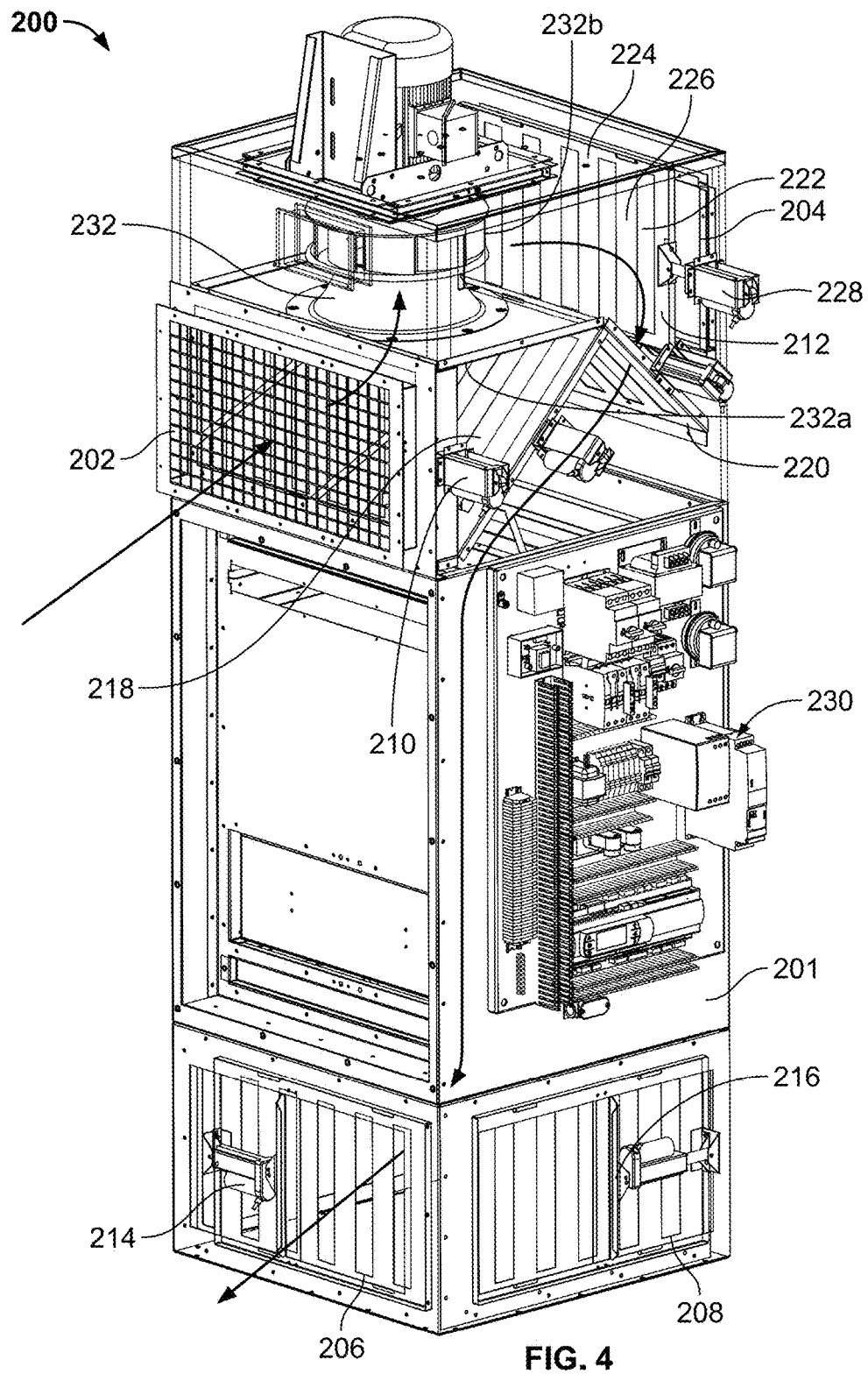
FIG. 4 is a perspective view of an alternative embodiment of reverse flow dehumidifier system showing air flow therethrough during a first operating phase and a second operating phase.
Figure 5:
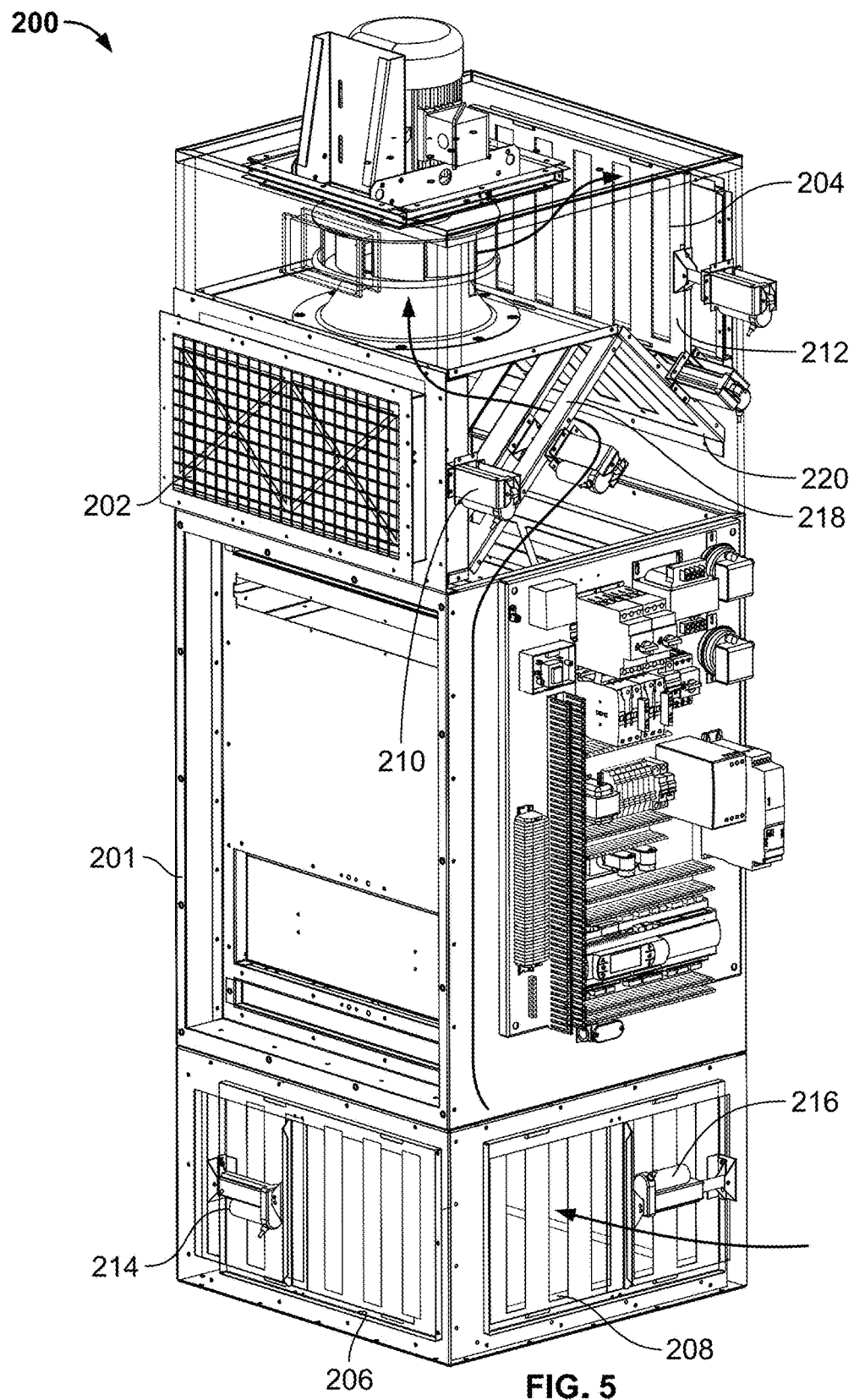
FIG. 5 is a perspective view of the reverse flow dehumidifier system shown in FIG. 4 showing air flow therethrough during a third operating phase.

An alternative embodiment of reverse flow dehumidifier system in accordance with the invention described herein is identified generally as 200 in FIGS. 4 and 5. Reverse flow dehumidifier system 200 is similar to reverse flow dehumidifier system 100 described above. Accordingly, only the differences between reverse flow dehumidifier system 200 and reverse flow dehumidifier system 100 are described in detail herein.

Reverse flow dehumidifier system 200 includes a housing 201 with an outside air inlet 202, a conditioned air outlet 204, a react discharge air outlet 206, and a conditioned air inlet 208. A first damper 210 is positioned adjacent outside air inlet 202 and is configured to move between a closed position, in which air cannot enter housing 201 through outside air inlet 202, and an open position, in which air is permitted to enter housing 201 through outside air inlet 202. A second damper 212 is positioned adjacent conditioned air outlet 204 and is configured to move between a closed position, in which air cannot exit housing 201 through conditioned air outlet 204, and an open position, in which air is permitted to exit housing 201 through conditioned air outlet 204. A third damper 214 is positioned adjacent react discharge air outlet 206 and is configured to move between a closed position, in which air cannot exit housing 201 through react discharge air outlet 206, and an open position, in which air is permitted to exit housing 201 through react discharge air outlet 206. A fourth damper 216 is positioned adjacent conditioned air inlet 208 and is configured to move between a closed position, in which air cannot enter housing 201 through conditioned air inlet 208, and an open position, in which air is permitted to enter housing 201 through conditioned air inlet 208.

Reverse flow dehumidifier system 200 also includes a first internal damper 218 and a second internal damper 220 that are operable to control air flow through housing 201. The first internal damper 218 is positioned between an inlet 232a of fan 232 and react discharge air outlet 206 and between the inlet 232a and conditioned air inlet 208. First internal damper 218 is movable between an open position, in which it permits air to flow from conditioned air inlet 208 to the inlet 232a of fan 232, and a closed position, in which it permits air to flow from outside air inlet 202 to the inlet 232a of fan 232. In the closed position, first internal damper 218 blocks the flow of air from the react discharge air outlet 206 into the inlet 232a of fan 232.

The second internal damper 220 is positioned between an outlet 232b of fan 232 and react discharge air outlet 206 and between the outlet 232b and conditioned air inlet 208. Second internal damper 220 is movable between an open position, in which it permits air to flow from the outlet 232b of fan 232 to the react discharge air outlet 206, and a closed position, in which it permits air to flow from the outlet 232b to conditioned air outlet 204. In the closed position, second internal damper 220 blocks the flow of air from the conditioned air outlet 204 to the fan inlet 232a.

Each of the dampers 210, 212, 214, 216, 218, and 220 has a similar construction. Accordingly, only second damper 212 is described in detail herein. Second damper 212 includes a plurality of fixed slats, one of which is identified as 222 in FIG. 4, with openings positioned between adjacent fixed slats 222. Second damper 212 includes a movable gate 224 that also includes a plurality of slats, one of which is identified as 226 in FIG. 4, with openings positioned between adjacent slats 226. The slats 226 of gate 224 have substantially the same width as both the fixed slats 222 and the openings between the fixed slats 222. When second damper 212 is in the closed position shown in FIG. 4, the slats 226 of gate 224 cover the openings between the fixed slats 222 to cover conditioned air outlet 204 to substantially block the flow of air through conditioned air outlet 204. When second damper 212 is in the open position shown in FIG. 5, the openings between the slats 226 of gate 224 are aligned with the openings between fixed slats 222 to open conditioned air outlet 204 and permit the flow of air through conditioned air outlet 204. The movable gate 224 is coupled to a damper motor 228 that is operable to move gate 224 between the open and closed positions. The damper motor 228 is preferably a linear motor operable to linearly move gate 224 in a relatively quick manner. The damper motor 228 is coupled to a control system 230 that is operable to actuate damper motor 228 to move gate 224 between the open and closed positions as desired. Similar damper motors are also coupled to dampers 210, 214, 216, 218, and 220 and control system 230 for opening and closing dampers 210, 214, 216, 218, and 220 as desired.

Reverse flow dehumidifier system 200 has first, second, and third operating phases that are substantially similar to the first, second, and third operating phases of reverse flow dehumidifier system 100. Control system 230 preferably controls the operation of reverse flow dehumidifier system 200 (including the timing of the first, second, and third operating phases) in a substantially similar manner as control system 102 described above. In the first operating phase, as shown in FIG. 4, first damper 210 is open, second damper 212 is closed, third damper 214 is open, fourth damper 216 is closed, first internal damper 218 is closed, and second internal damper 220 is open. In this configuration, fan 232 pulls air into housing 201 through outside air inlet 202. The air is routed downward through second internal damper 220 where it is heated by a heater (not shown) and dries the desiccant media (not shown) as described above in connection with reverse flow dehumidifier system 100. The air then exits through the react discharge air outlet 206.

In the second operating phase, also shown in FIG. 4, the air flows through reverse flow dehumidifier system 200 in the same manner as described above with respect to the first operating phase except that the heater (not shown) is off so that the air cools the desiccant media (not shown) as it passes through housing 201.

In the third operating phase, shown in FIG. 5, first damper 210 is closed, second damper 212 is open, third damper 214 is closed, fourth damper 216 is open, first internal damper 218 is open, and second internal damper 220 is closed. Fan 232 pulls air into housing 201 through conditioned air inlet 208. The air flows through the desiccant media (not shown) which adsorbs moisture from the air as described above in connection with reverse flow dehumidifier system 100. The air flows through the first internal damper 218 and is directed out of housing 201 through conditioned air outlet 204.

Figure 6:
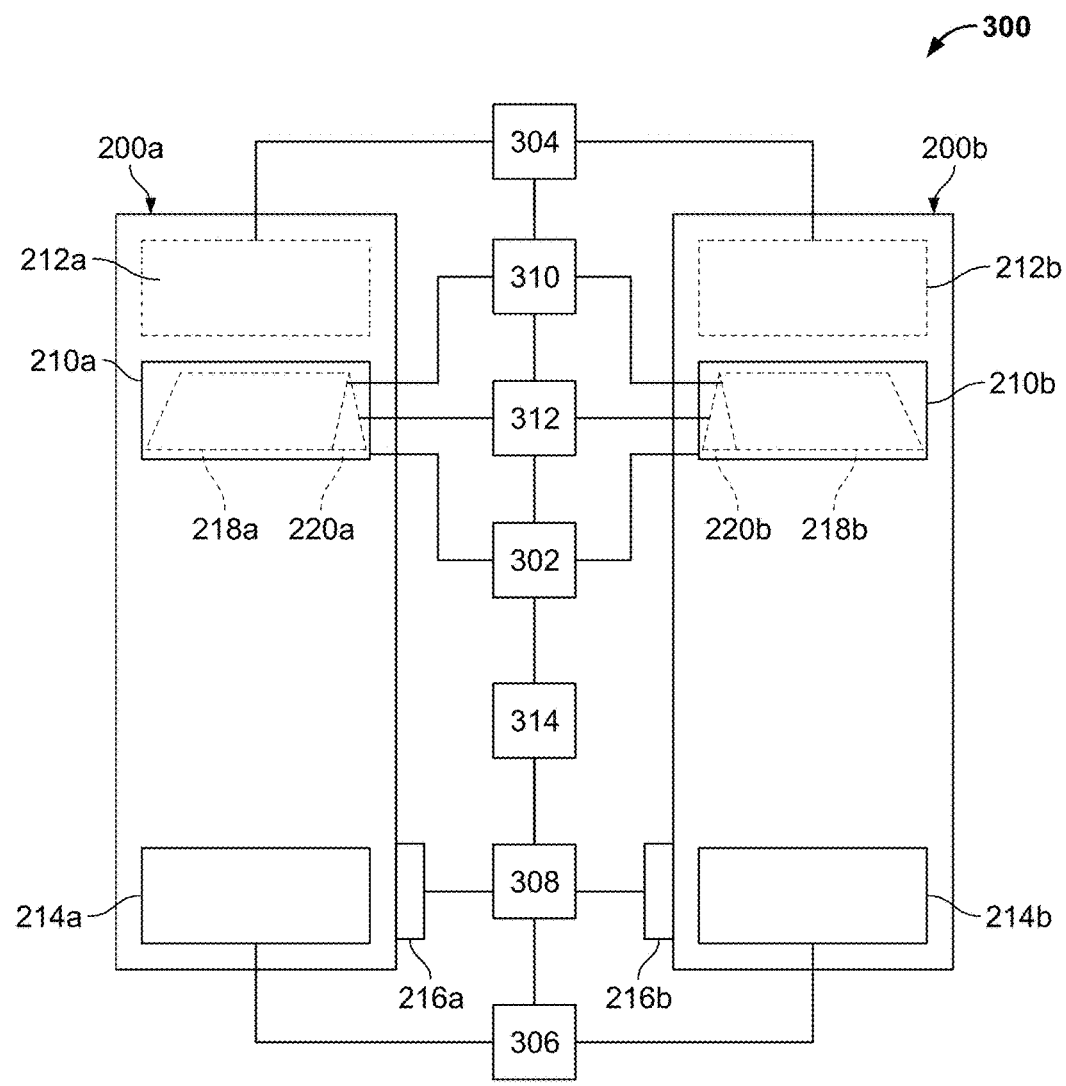
FIG. 6 is a schematic view of a dehumidification system that includes a pair of the reverse flow dehumidifier systems shown in FIG. 4 as modified to work in combination with each other.

FIG. 6 shows a schematic of one embodiment of a dehumidification system 300 using two reverse flow dehumidifier systems 200a-b placed side-by-side and modified as described below to operate in combination with each other. Dehumidification system 300 is preferably operable for continuous dehumidification of a conditioned space. Reverse flow dehumidifier system 200a includes first, second, third, and fourth dampers 210a, 212a, 214a, and 216a and first and second internal dampers 218a and 220a as described above in connection with reverse flow dehumidifier system 200. Reverse flow dehumidifier system 200b includes first, second, third, and fourth dampers 210b, 212b, 214b, and 216b and first and second internal dampers 218b and 220b as described above in connection with reverse flow dehumidifier system 200.

Dehumidification system 300 includes common damper motors that are used to control the dampers of both reverse flow dehumidifier system 200a and reverse flow dehumidifier system 200b as described herein. A first damper motor 302 is coupled to the first dampers 210a-b, a second damper motor 304 is coupled to the second dampers 212a-212b, a third damper motor 306 is coupled to the third dampers 214a-b, a fourth damper motor 308 is coupled to the fourth dampers 216a-b, a first internal damper motor 310 is coupled to the first internal dampers 218a-b, and a second internal damper motor 312 is coupled to the second internal dampers 220a-b. The damper motors 302, 304, 306, and 308 and dampers 210a-b, 212a-b, 214a-b, and 216a-b (and the internal damper motors 310, 312 and internal dampers 218a-b, 220a-b) are configured so that when a damper of reverse flow dehumidifier system 200a is open the corresponding damper of reverse flow dehumidifier system 200b is closed and vice versa. For example, first damper motor 302 is coupled to first dampers 210a-b such that when first damper 210a is open, first damper 210b is closed and such that when first damper 210a is closed, first damper 210b is open. A control system 314, which may operate in a substantially similar manner as control system 102 and control system 230 described above, is coupled to the damper motors 302, 304, 306, 308, 310, 312, and 314 to control the movement of the damper motors.

When reverse flow dehumidifier system 200a is in either the first operating phase or the second operating phase, as described above in connection with reverse flow dehumidifier systems 100 and 200, reverse flow dehumidifier system 200b is in the third operating phase. Likewise, when reverse flow dehumidifier system 200a is in the third operating phase, reverse flow dehumidifier system 200b is in the first operating phase or the second operating phase. Thus, one of the reverse flow dehumidifier systems 200a-b is outputting conditioned air into a conditioned space to remove moisture from the air within the conditioned space, while the other of reverse flow dehumidifier systems 200a-b is removing moisture from and cooling its desiccant media. Because one of reverse flow dehumidifier systems 200a-b is always in the third operating phase, dehumidification system 300 can continuously remove moisture from the air within the conditioned space.

Because dehumidification system 300 uses a single damper motor to control a pair of dampers (e.g., first damper motor 302 controls both of first dampers 210a-b) and a single control system 314 to control two reverse flow dehumidifier systems 200a-b, dehumidification system 300 is less expensive than two separate reverse flow dehumidifier systems 200. Further, reverse flow dehumidifier systems 200a-b may be physically coupled together, which would allow for the removal of a side wall of each reverse flow dehumidifier system 200a-b and further lower the cost of dehumidification system 300 versus that of two separate reverse flow dehumidifier systems 200.

Dehumidification system 300 is preferably used in applications where constant dehumidification is desired, such as a spiral food freezer. In operation, a spiral food freezer has a continuous somewhat steady state moisture gain from food entering the freezer at a near continuous rate. Thus, it is desirable to continuously remove moisture from the freezer in order to enhance the quality of food moving through the freezer, improve the freezer's cooling efficiency, and maintain the freezer in an operational state for a longer time period. It is within the scope of the invention for dehumidification system 300 to use two reverse flow dehumidifier systems 100 instead of two reverse flow dehumidifier systems 200.

Exemplary embodiments of the reverse flow dehumidifier system and methods are described above in detail. The accessory system and methods are not limited to the specific embodiments described herein, but rather, components of the accessory system and/or steps of the methods may be utilized independently and separately from other components and/or steps described herein. For example, the systems may also be used in combination with other systems and methods, and is not limited to practice with only the embodiments as described herein. Rather, the exemplary embodiments can be implemented and utilized in connection with many other applications and buildings such as, but not limited to, archival storage, libraries, and waste water treatment plants.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A reverse flow dehumidifier system comprising:
   a housing comprising an outside air inlet, a react discharge air outlet, a conditioned air inlet, and a conditioned air outlet;
   a static desiccant block coupled to the housing and comprising a desiccant media;
   a heater coupled to the housing and configured to heat air within the housing;
   a fan configured during a first operating phase and a second operating phase to direct air entering the housing through the outside air inlet across the desiccant media and out of the housing through the react discharge air outlet, and wherein the fan is configured during a third operating phase to direct air entering the housing through the conditioned air inlet across the desiccant media and out of the housing through the conditioned air outlet; and
   a control system operatively coupled to at least one of the fan and the heater and comprising a plurality of sensors selectively positioned and configured to measure at least one air parameter of the air within the housing.

2. The system of claim 1, wherein during the first operating phase a desorption process is applied to the desiccant media, wherein during the second operating phase a cooling process is applied to the desiccant media, and wherein during the third operating phase an adsorption process is applied to the air entering the housing through the conditioned air inlet.

3. The system of claim 1, wherein the plurality of sensors comprises a first sensor positioned between the static desiccant block and the outside air inlet.

4. The system of claim 3, wherein the plurality of sensors comprises a second sensor positioned between the static desiccant block and the react discharge air outlet.

5. The system of claim 3, wherein the first sensor is positioned between the heater and the outside air inlet, and wherein the plurality of sensors further comprises:
   a second sensor positioned between the heater and the static desiccant block; and
   a third sensor positioned between the static desiccant block and the react discharge air outlet.

6. The system of claim 1, further comprising a first damper coupled to the housing, wherein the first damper is movable between a closed position, in which it blocks air from entering the housing through the outside air inlet, and an open position, in which air may enter the housing through the outside air inlet.

7. The system of claim 6, further comprising a second damper coupled to the housing, wherein the second damper is movable between a closed position, in which it blocks air from exiting the housing through the conditioned air outlet, and an open position, in which air may exit the housing through the conditioned air outlet.

8. The system of claim 7, further comprising a third damper coupled to the housing, wherein the third damper is movable between a first position, in which air may exit the housing through the react discharge air outlet, and a second position, in which it blocks air from exiting the housing through the react discharge air outlet.

9. The system of claim 8, wherein when the third damper is in the first position it blocks air from entering the housing through the conditioned air inlet, and wherein when the third damper is in the second position it does not block air from entering the housing through the conditioned air inlet.

10. The system of claim 8, further comprising a fourth damper coupled to the housing, wherein the fourth damper is movable between a closed position, in which it blocks air from entering the housing through the conditioned air inlet, and an open position, in which air may enter the housing through the conditioned air inlet.

11. The system of claim 8, wherein the control system is coupled to the first damper and is configured to send instructions to the first damper to move the first damper between the closed position and the open position, wherein the control system is coupled to the second damper and is configured to send instructions to the second damper to move the second damper between the closed position and the open position, and wherein the control system is coupled to the third damper and is configured to send instructions to the third damper to move the third damper between the first position and the second position.

12. The system of claim 8, wherein during the first and second operating phases the first damper is in the open position, the second damper is in the closed position, and the third damper is in the first position, and wherein during the third operating phase the first damper is in the closed position, the second damper is in the open position, and the third damper is in the second position.

13. The system of claim 8, wherein the fan comprises an inlet and an outlet, and further comprising a first internal damper that is coupled to the housing between the inlet of the fan and the react discharge air outlet and between the inlet of the fan and the conditioned air inlet, wherein the first internal damper is movable between an open position, in which it permits air to flow from the conditioned air inlet to the inlet of the fan, and a closed position, in which it blocks air flow from the react discharge air outlet to the inlet of the fan.

14. The system of claim 13, further comprising a second internal damper that is coupled to the housing between the outlet of the fan and the react discharge air outlet and between the outlet of the fan and the conditioned air inlet, wherein the second internal damper is movable between an open position, in which it permits air to flow from the outlet of the fan to the react discharge air outlet, and a closed position, in which it blocks air flow from the conditioned air outlet to the inlet of the fan.

15. The system of claim 14, wherein during the first and second operating phases the first internal damper is in the closed position and the second internal damper is in the open position, and wherein during the third operating phase the first internal damper is in the open position and the second internal damper is in the closed position.

16. A reverse flow dehumidifier system comprising:
   a housing comprising an outside air inlet, a react discharge air outlet, a conditioned air inlet, and a conditioned air outlet;
   a static desiccant block coupled to the housing and comprising a desiccant media;
   a heater coupled to the housing and configured to heat air within the housing;
   a first damper coupled to the housing, wherein the first damper is movable between a closed position, in which it blocks air from entering the housing through the outside air inlet, and an open position, in which air may enter the housing through the outside air inlet;
   a second damper coupled to the housing, wherein the second damper is movable between a closed position, in which it blocks air from exiting the housing through the conditioned air outlet, and an open position, in which air may exit the housing through the conditioned air outlet;
   a third damper coupled to the housing, wherein the third damper is movable between a first position, in which air may exit the housing through the react discharge air outlet, and a second position, in which it blocks air from exiting the housing through the react discharge air outlet,
   wherein during a first operating phase and a second operating phase, the first damper is in the open position, the second damper is in the closed position, and the third damper is in the first position, and
   wherein during a third operating phase, the first damper is in the closed position, the second damper is in the open position, and the third damper is in the second position; and
   a fan coupled to the housing and configured during the first operating phase and the second operating phase to direct air entering the housing through the outside air inlet across the desiccant media and out of the housing through the react discharge air outlet, and wherein the fan is configured during the third operating phase to direct air entering the housing through the conditioned air inlet across the desiccant media and out of the housing through the conditioned air outlet.

17. The system of claim 16, further comprising a control system that is coupled to the first damper and is configured to send instructions to the first damper to move the first damper between the closed position and the open position, wherein the control system is coupled to the second damper and is configured to send instructions to the second damper to move the second damper between the closed position and the open position, and wherein the control system is coupled to the third damper and is configured to send instructions to the third damper to move the third damper between the first position and the second position.

18. The system of claim 17, wherein the control system is coupled to the heater and is configured to send instructions to the heater to turn the heater on during the first operating phase and off during the second operating phase and the third operating phase.

19. The system of claim 16, wherein the control system comprises:
   a first sensor positioned between the heater and the outside air inlet and configured to measure at least one air parameter of the air within the housing;
   a second sensor positioned between the heater and the static desiccant block and configured to measure at least one air parameter of the air within the housing; and
   a third sensor positioned between the static desiccant block and the react discharge air outlet and configured to measure at least one air parameter of the air within the housing.

20. The system of claim 16, wherein when the third damper is in the first position it blocks air from entering the housing through the conditioned air inlet, and wherein when the third damper is in the second position it does not block air from entering the housing through the conditioned air inlet.

21. The system of claim 16, further comprising a fourth damper coupled to the housing, wherein the fourth damper is movable between a closed position, in which it blocks air from entering the housing through the conditioned air inlet, and an open position, in which air may enter the housing through the conditioned air inlet.

22. A dehumidification system comprising:
   a first reverse flow dehumidifier system comprising:
      a first housing comprising a first outside air inlet, a first react discharge air outlet, a first conditioned air inlet, and a first conditioned air outlet;
      a first static desiccant block coupled to the first housing and comprising a first desiccant media;
      a first heater coupled to the first housing and configured to heat air within the first housing;
      a first damper coupled to the first housing, wherein the first damper is movable between a closed position, in which it blocks air from entering the first housing through the first outside air inlet, and an open position, in which air may enter the first housing through the first outside air inlet;
      a second damper coupled to the first housing, wherein the second damper is movable between a closed position, in which it blocks air from exiting the first housing through the first conditioned air outlet, and an open position, in which air may exit the first housing through the first conditioned air outlet;
      a third damper coupled to the first housing, wherein the third damper is movable between a first position, in which air may exit the first housing through the first react discharge air outlet, and a second position, in which it blocks air from exiting the first housing through the first react discharge air outlet,
wherein during a first operating phase of the first reverse flow dehumidifier system and a second operating phase of the first reverse flow dehumidifier system, the first damper is in the open position, the second damper is in the closed position, and the third damper is in the first position, and
wherein during a third operating phase of the first reverse flow dehumidifier system, the first damper is in the closed position, the second damper is in the open position, and the third damper is in the second position; and
a first fan coupled to the first housing and configured during the first operating phase of the first reverse flow dehumidifier system and the second operating phase of the first reverse flow dehumidifier system to direct air entering the first housing through the first outside air inlet across the first desiccant media and out of the first housing through the first react discharge air outlet, and wherein the first fan is configured during the third operating phase of the first reverse flow dehumidifier system to direct air entering the first housing through the first conditioned air inlet across the first desiccant media and out of the first housing through the first conditioned air outlet;
a second reverse flow dehumidifier system comprising:
  a second housing comprising a second outside air inlet, a second react discharge air outlet, a second conditioned air inlet, and a second conditioned air outlet;
  a second static desiccant block coupled to the second housing and comprising a second desiccant media;
  a second heater coupled to the second housing and configured to heat air within the second housing; and
  a fourth damper coupled to the second housing, wherein the fourth damper is movable between a closed position, in which it blocks air from entering the second housing through the second outside air inlet, and an open position, in which air may enter the second housing through the second outside air inlet;
  a fifth damper coupled to the second housing, wherein the fifth damper is movable between a closed position, in which it blocks air from exiting the second housing through the second conditioned air outlet, and an open position, in which air may exit the second housing through the second conditioned air outlet;
  a sixth damper coupled to the second housing, wherein the sixth damper is movable between a first position, in which air may exit the second housing through the second react discharge air outlet, and a second position, in which it blocks air from exiting the second housing through the second react discharge air outlet,
wherein during a first operating phase of the second reverse flow dehumidifier system and a second operating phase of the second reverse flow dehumidifier system, the fourth damper is in the open position, the fifth damper is in the closed position, and the sixth damper is in the first position, and
wherein during a third operating phase of the second reverse flow dehumidifier system, the fourth damper is in the closed position, the fifth damper is in the open position, and the sixth damper is in the second position; and
a second fan coupled to the second housing and configured during the first operating phase of the second reverse flow dehumidifier system and the second operating phase of the second reverse flow dehumidifier system to direct air entering the second housing through the second outside air inlet across the second desiccant media and out of the second housing through the second react discharge air outlet, and wherein the second fan is configured during the third operating phase of the second reverse flow dehumidifier system to direct air entering the second housing through the second conditioned air inlet across the second desiccant media and out of the second housing through the second conditioned air outlet;
a first damper motor that is coupled to and operable to move each of the first damper and the fourth damper so that the first damper is in the open position when the fourth damper is in the closed position and vice versa;
a second damper motor that is coupled to and operable to move each of the second damper and the fifth damper so that the second damper is in the open position when the fifth damper is in the closed position and vice versa; and
a third damper motor that is coupled to and operable to move each of the third damper and the sixth damper so that the third damper is in the first position when the sixth damper is in the second position and vice versa.

* * * * *